(12) United States Patent
Zhang

(10) Patent No.: US 12,000,447 B2
(45) Date of Patent: Jun. 4, 2024

(54) MULTI-PISTON-DEDICATED HEAT DISSIPATING CALIPER COVER WITH EASY INSTALLATION

(71) Applicant: Jianping Zhang, Shanghai (CN)

(72) Inventor: Jianping Zhang, Shanghai (CN)

( * ) Notice: Subject to any disclaimer, the term of this patent is extended or adjusted under 35 U.S.C. 154(b) by 427 days.

(21) Appl. No.: 17/425,731

(22) PCT Filed: Aug. 11, 2020

(86) PCT No.: PCT/CN2020/108470
§ 371 (c)(1),
(2) Date: Jul. 26, 2021

(87) PCT Pub. No.: WO2021/120643
PCT Pub. Date: Jun. 24, 2021

(65) Prior Publication Data
US 2022/0106994 A1 Apr. 7, 2022

(30) Foreign Application Priority Data
Dec. 16, 2019 (CN) .......................... 201911295856.5

(51) Int. Cl.
*F16D 65/847* (2006.01)
(52) U.S. Cl.
CPC ...... *F16D 65/847* (2013.01); *F16D 2200/003* (2013.01); *F16D 2200/0034* (2013.01); *F16D 2250/0069* (2013.01)
(58) Field of Classification Search
CPC ............... F16D 65/0081; F16D 65/847; F16D 2055/0037

USPC ...................................................... 188/218 A
See application file for complete search history.

(56) References Cited

U.S. PATENT DOCUMENTS

| 7,195,108 | B2 * | 3/2007 | Gotti | F16D 65/00 |
| | | | | 188/264 G |
| 7,849,982 | B1 * | 12/2010 | Tamura | F16D 55/227 |
| | | | | 188/73.43 |
| 10,962,067 | B2 * | 3/2021 | Park | F16D 55/22 |
| 2018/0010656 | A1 * | 1/2018 | Barland | F16D 65/0081 |

(Continued)

FOREIGN PATENT DOCUMENTS

| CN | 107289045 A | * 10/2017 | ............. F16D 65/84 |
| CN | 110388396 A | * 10/2019 | ........... F16D 55/226 |

(Continued)

*Primary Examiner* — Thomas J Williams
(74) *Attorney, Agent, or Firm* — Bayramoglu Law Offices LLC

(57) ABSTRACT

A multi-piston-dedicated heat dissipating caliper cover with easy installation includes a caliper cover body, a fixing assembly and at least two first fixing bolts. One side edge of the caliper cover body extends toward a side to form a first arc-shaped side plate, and the other side edge of the caliper cover body extends toward a side to form a second arc-shaped side plate. The fixing assembly includes a bolt fixing sheet and a positioning sheet, one end of the positioning sheet is connected with the bolt fixing sheet through a second fixing bolt, and the other end of the positioning sheet passes through a strip-shaped hole and then is inserted into a slot at a top of a brake caliper. By disposing the heat dissipating silicone sheet, a contact area is increased, which allows the heat generated by the brake caliper to be quickly transferred to the caliper cover.

11 Claims, 5 Drawing Sheets

(56) References Cited

U.S. PATENT DOCUMENTS

| | | | |
|---|---|---|---|
| 2018/0080512 A1* | 3/2018 | Barland | F16D 65/0087 |
| 2018/0231076 A1* | 8/2018 | Choi | F16D 65/0006 |
| 2019/0338815 A1* | 11/2019 | Park | F16D 65/0081 |
| 2022/0106994 A1* | 4/2022 | Zhang | F16D 65/0075 |

FOREIGN PATENT DOCUMENTS

| | | | | |
|---|---|---|---|---|
| CN | 111306221 A | * | 6/2020 | |
| KR | 20190080462 A | * | 7/2019 | F16D 65/0068 |

* cited by examiner

MULTI-PISTON-DEDICATED HEAT DISSIPATING CALIPER COVER WITH EASY INSTALLATION

CROSS REFERENCE TO THE RELATED APPLICATIONS

This application is the national phase entry of International Application No. PCT/CN2020/108470, filed on Aug. 11, 2020, which is based upon and claims priority to Chinese Patent Application No. 201911295856.5, filed on Dec. 16, 2019, the entire contents of which are incorporated herein by reference.

TECHNICAL FIELD

Embodiments of the present application relate to the field of automotive accessories, and in particular to a multi-piston-dedicated heat dissipating caliper cover with easy installation.

BACKGROUND

An automobile brake caliper assembly is an important part of an automobile braking system. In the process of braking an automobile, by means of a brake pedal, a brake master cylinder and a brake pipeline, the driver will eventually act on a brake disc through a brake caliper friction block to generate a braking force for braking the automobile. When the brake pedal is stepped on, the brake disc is clamped by the brake caliper to decelerate or stop the automobile. The brake caliper is the executor of direct commands in the entire braking system and plays a vital role in the system.

The caliper cover plays the roles of decoration and protection for the brake caliper, and it is beginning to be used by more users. The caliper cover on the market is divided into a general caliper cover and a dedicated caliper cover. The general caliper cover needs to be glued. If it is required to replace the brake disc, removing the caliper cover would be very difficult, and the general caliper cover is not safe during use. Also, it will affect heat dissipation of the caliper. The shapes do not match since the original caliper is ever-changing and the caliper cannot be completely enclosed. The dedicated automobile caliper cover is obtained by stamping an aluminum alloy sheet using a circular arc-shaped flat die, and it has a circular arc-shaped flat profile, which can cover the original caliper and be fixedly installed using a buckle. The fixing structure has obvious defects due to the design: the buckle and a connecting bracket are too long, and have large amounts of deformation, which can easily cause the caliper cover to sway and rub against a wheel hub, thereby affecting driving safety. In addition, due to the small contact area between the dedicated caliper cover and the brake caliper, there is also a problem of poor heat dissipating effect.

SUMMARY

To this end, embodiments of the present application provide a multi-piston-dedicated heat dissipating caliper cover with easy installation, so as to solve the problems of inconvenient installation and disassembly, poor heat dissipating effect, and low safety of existing caliper covers.

In order to achieve the above object, embodiments of the present application provide a multi-piston-dedicated heat dissipating caliper cover with easy installation. The multi-piston-dedicated heat dissipating caliper cover with easy installation includes a caliper cover body, one side edge of the caliper cover body extends toward a side to form a first arc-shaped side plate, and the other side edge of the caliper cover body extends toward a side to form a second arc-shaped side plate; the multi-piston-dedicated heat dissipating caliper cover with easy installation further includes a fixing assembly and at least two first fixing bolts, the second arc-shaped side plate is provided with at least two bolt holes, and each of the first fixing bolts passes through the bolt hole in a one-to-one correspondence and then abuts against a groove at a bottom of a brake caliper; the fixing assembly includes a bolt fixing sheet and a positioning sheet, the first arc-shaped side plate is provided with a notch, and the bolt fixing sheet is located in the notch and connected with the first arc-shaped side plate; the bolt fixing sheet is provided with a strip-shaped hole, one end of the positioning sheet is connected with the bolt fixing sheet through a second fixing bolt, and the other end of the positioning sheet passes through the strip-shaped hole and then is inserted into a slot at a top of the brake caliper.

Further, the multi-piston-dedicated heat dissipating caliper cover with easy installation further includes at least one heat dissipating assembly for transferring heat of the brake caliper to the caliper cover.

Further, the heat dissipating assembly includes a heat dissipating silicone sheet and a heat dissipating adhesive layer, the heat dissipating adhesive layer is disposed on sides of the caliper cover body, the first arc-shaped side plate and/or the second arc-shaped side plate that are close to the brake caliper, and the heat dissipating silicone sheet is disposed on a side of the heat dissipating adhesive layer that is close to the brake caliper.

Further, the heat dissipating assembly further includes a thermally conductive silicone cloth, which is disposed on the side of the heat dissipating silicone sheet that is close to the brake caliper.

Further, the material of the caliper cover body is aluminum alloy.

Further, the arc of the first arc-shaped side plate matches the arc of the top of the brake caliper, and the arc of the second arc-shaped side plate matches the arc of the bottom of the brake caliper.

Further, the positioning sheet is L-shaped, and one end of the positioning sheet is provided with a through hole.

Further, the bolt fixing sheet is riveted to the first arc-shaped side plate.

The embodiments of the present application have the following advantages:

1. In the multi-piston-dedicated heat dissipating caliper cover of the embodiments of the present application, the caliper cover is fixed through a cooperation of the first fixing bolts and the fixing assembly, which not only facilitates installation and disassembly, but also avoids loosening of the caliper cover during use, making it safer in use.

2. In the multi-piston-dedicated heat dissipating caliper cover of the embodiments of the present application, by disposing the heat dissipating silicone sheet on sides of the caliper cover body, the first arc-shaped side plate and the second arc-shaped side plate that are close to the brake caliper, a contact area between the caliper cover and the brake caliper is increased, which allows the heat generated by the brake caliper to be quickly transferred to the caliper cover so that the heat is dissipated through the caliper cover with excellent heat dissipating performance; at the same time, the heat dissipating silicone sheet can make the caliper cover and the brake caliper fit more closely so as to implement shock absorption, thus avoiding the collision of the caliper cover and the brake caliper during the driving process of the vehicle to produce sound and wear.

BRIEF DESCRIPTION OF THE DRAWINGS

The accompanying drawing required to be used in the description of the embodiments of the present application or the related art are described briefly below, so that the technical solutions according to the embodiments of the present application or according to the related art will become clearer. It is apparent that the accompanying drawings in the following description are only illustrative. For those skilled in the art, other accompanying drawings may also be obtained according to these drawings provided, without any creative work.

The structure, proportion, size and the like shown in the specification are only used to cooperate with the contents disclosed in the specification for those skilled in the art to understand and read, and are not intended to limit the conditions with which the present application can be implemented. Therefore, they have no practical significance in a technical sense. Any modification to the structure, any change of the proportions or any adjustment to the size should fall within the scope covered by the technical contents disclosed in the present application without influencing the effects and objects that can be achieved by the present application.

DESCRIPTION OF REFERENCE SIGNS

10: caliper cover body; 20: first arc-shaped side plate; 30: second arc-shaped side plate; 31: bolt hole; 40: fixing assembly; 41: bolt fixing sheet; 42: positioning sheet; 43: second fixing bolt; 50: first fixing bolt; 60: heat dissipating assembly; 61: heat dissipating silicone sheet; 62: heat dissipating adhesive layer; 63: thermally conductive silicone cloth; 70: brake caliper; 71: groove; 72: slot.

DETAILED DESCRIPTION OF THE EMBODIMENTS

The implementations of the present application will be described in the specific embodiments below, and other advantages and functions of the present application can be readily understood by those skilled in the art from the contents disclosed in the specification. It is apparent that the described embodiments are part of the embodiments of the present application, instead of all of them. All the other embodiments obtained by those skilled in the art on the basis of the embodiments of the present application without creative efforts will fall within the scope of protection of the present application.

Figure 1:
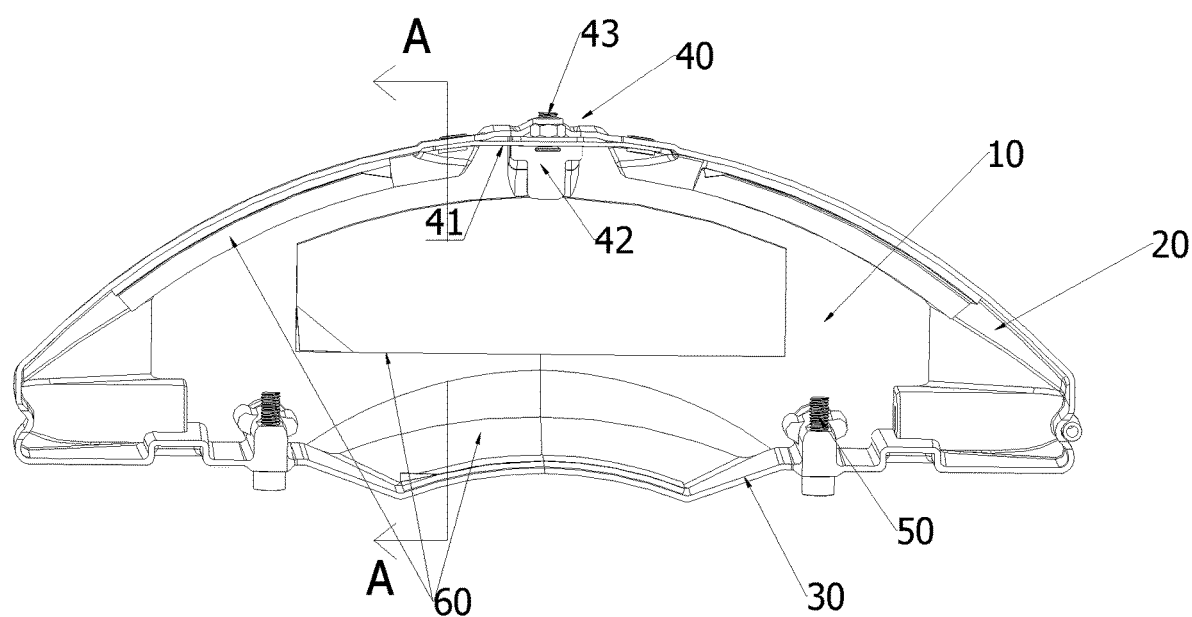
FIG. 1 is a schematic structural front view of a multi-piston-dedicated heat dissipating caliper cover with easy installation provided by an embodiment of the present application.
Figure 2:
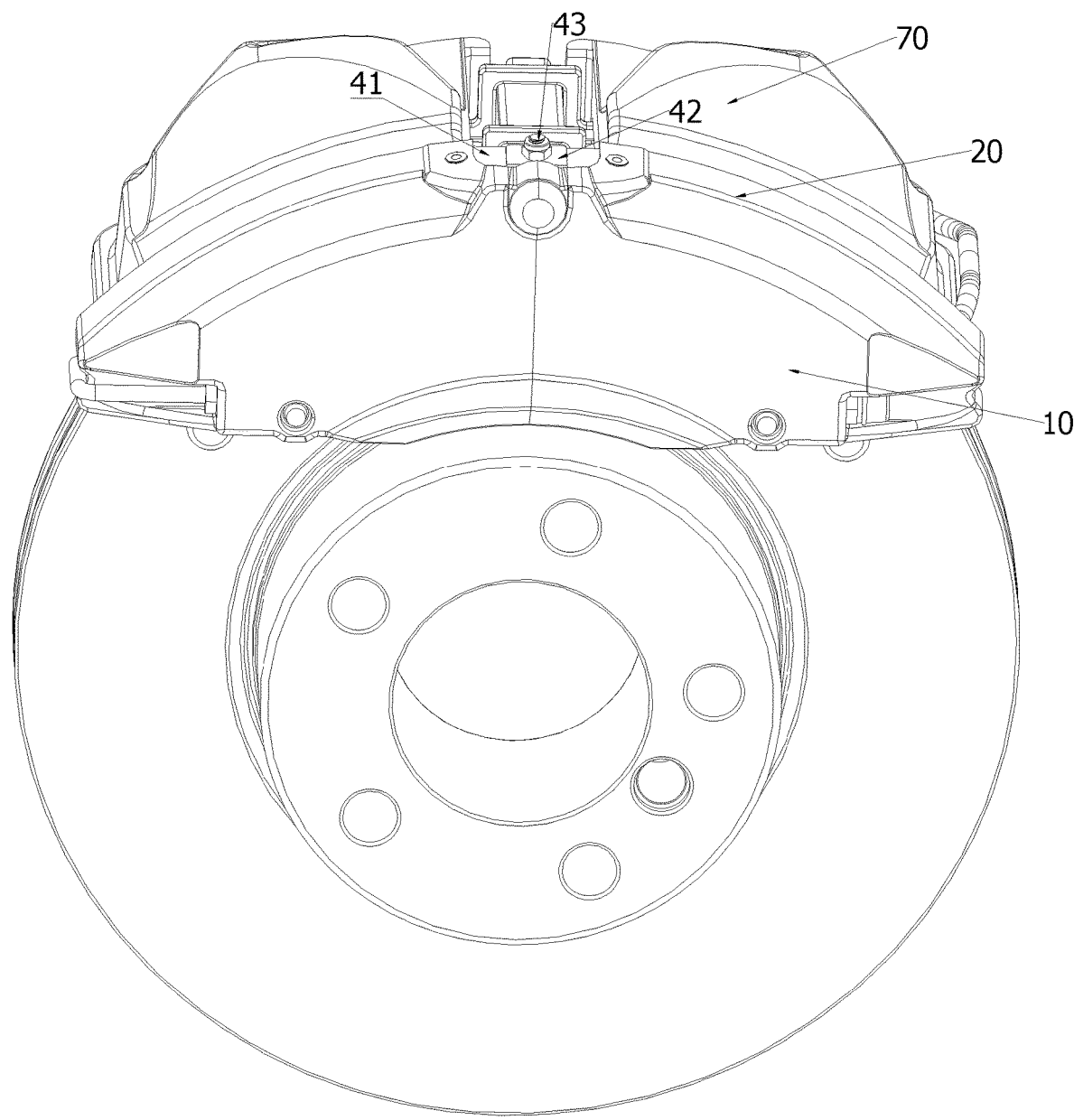
FIG. 2 is a schematic view showing the installation of the multi-piston-dedicated heat dissipating caliper cover with easy installation provided by the embodiment of the present application.
Figure 3:
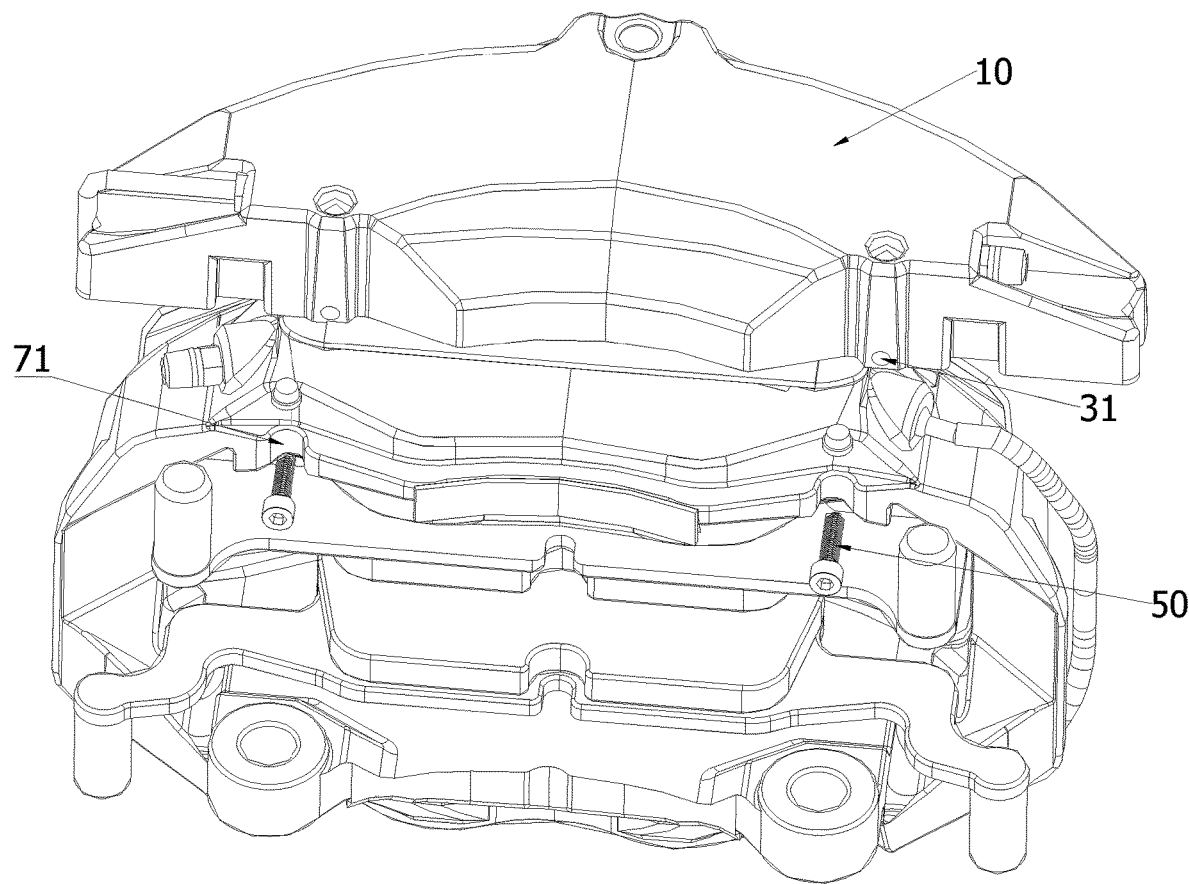
FIG. 3 is a schematic structural bottom view showing a state in which the multi-piston-dedicated heat dissipating caliper cover with easy installation provided by the embodiment of the present application is separated from a brake caliper.
Figure 4:
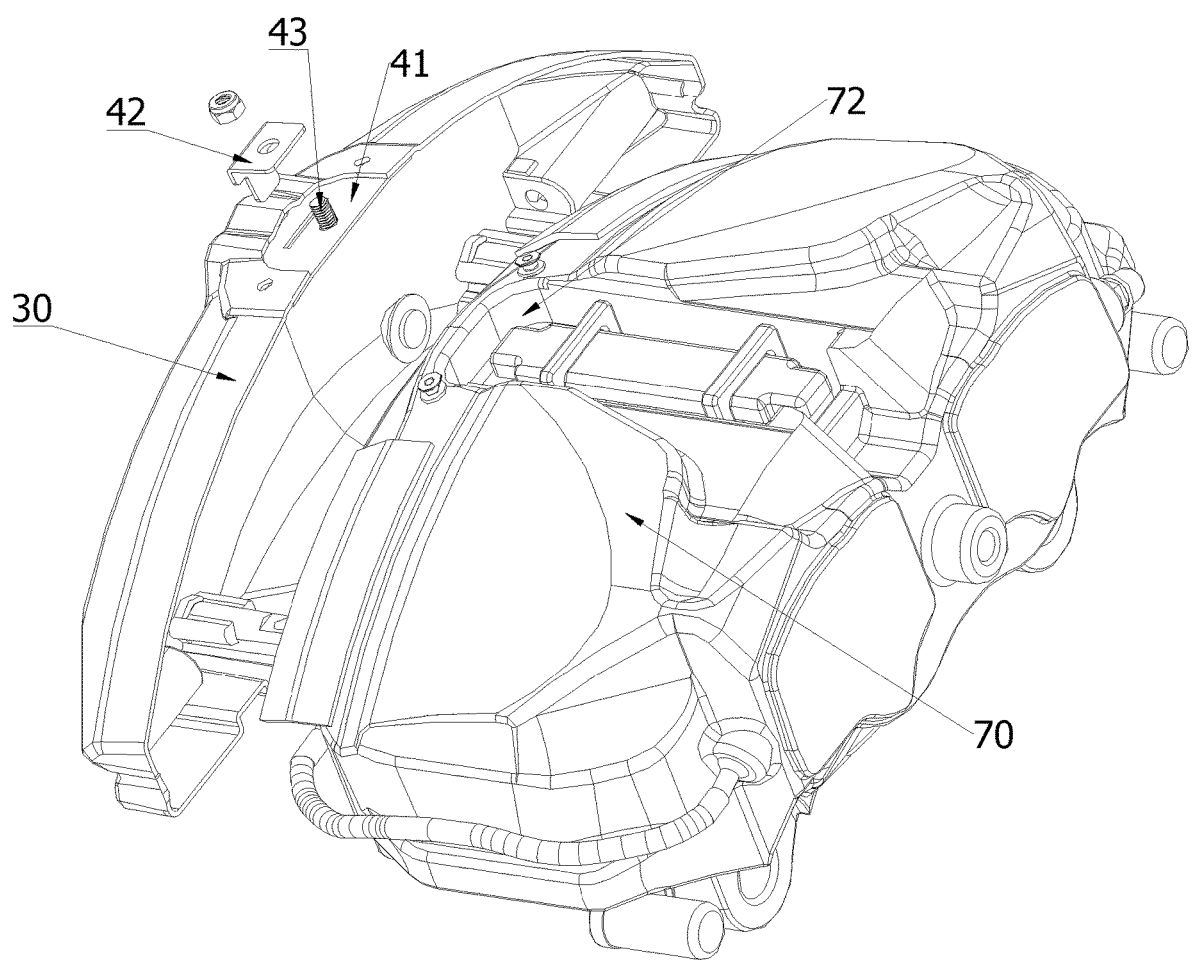
FIG. 4 is a schematic structural top view showing a state in which the multi-piston-dedicated heat dissipating caliper cover with easy installation provided by the embodiment of the present application is separated from the brake caliper.

As shown in FIG. 1, the multi-piston-dedicated heat dissipating caliper cover with easy installation includes a caliper cover body 10, a fixing assembly 40 and at least two first fixing bolts 50. One side edge of the caliper cover body 10 extends toward a side of the caliper cover body 10 to form a first arc-shaped side plate 20, and the other side edge of the caliper cover body extends toward a side of the caliper cover body 10 to form a second arc-shaped side plate 30. The arc of the first arc-shaped side plate 20 matches the arc of a top of the brake caliper 70. The first arc-shaped side plate 20 is provided with a notch at a position corresponding to the position of a slot 72 at the top of the brake caliper 70. The arc of the second arc-shaped side plate 30 matches the arc of a bottom of the brake caliper 70. Therefore, the entire caliper cover fits closely with the brake caliper 70. As compared with the existing caliper covers, the caliper cover of this embodiment fits more closely with the brake caliper 70, which increases the contact area between the caliper cover with the brake caliper 70 and enhances the heat dissipating effect. The materials of the caliper cover body 10, the first arc-shaped side plate 20 and the second arc-shaped side plate 30 are each aluminum alloy. Due to the excellent heat dissipating effect of aluminum alloy, when the heat generated by the brake caliper 70 is transferred to the caliper cover, the caliper cover can quickly dissipate the heat. There are a variety of colors for the caliper cover to choose, so the problem of the single color of the original automobile is completely solved. As shown in FIG. 3, two bolt holes 31 are provided on the second arc-shaped side plate 30, and correspondingly the number of the first fixing bolts 50 is also two. Of course, the number of the bolt holes 31 and the number of the first fixing bolts 50 are not limited to two. Each of the first fixing bolts 50 passes through the bolt hole 31 in a one-to-one correspondence and then abuts against a groove 71 at the bottom of the brake caliper 70. As shown in FIG. 4, the fixing assembly 40 includes a bolt fixing sheet 41 and a positioning sheet 42, the first arc-shaped side plate 20 is provided with the notch, and the bolt fixing sheet 41 is located in the notch and riveted with the first arc-shaped side plate 20. The bolt fixing sheet 41 is provided with a strip-shaped hole. The positioning sheet 42 is L-shaped, and one end of the positioning sheet 42 is provided with a through hole. One end of the positioning sheet 42 is connected with the bolt fixing sheet 41 through a second fixing bolt 43, and the other end of the positioning sheet 42 passes through the strip-shaped hole and then is inserted into the slot 72 at the top of the brake caliper 70. The bottom of the caliper cover is connected to the brake caliper 70 by the two first fixing bolts 50, and the top of the caliper cover is hooked on the edge of the slot 72 by the positioning sheet 42, so that the caliper cover is firmly fixed on the brake caliper 70. As shown in FIG. 2, during disassembling, it is only required to loosen the two first fixing bolts 50, then loosen the second fixing bolt 43, and then take out the positioning sheet 42, so that the caliper cover can be removed. As compared with the traditional caliper covers, it is more convenient to disassemble and install the caliper cover of this embodiment. The caliper cover is fixed through the cooperation of the first fixing bolts 50 and the fixing assembly 40, which not only facilitates installation and disassembly, but also avoids loosening of the caliper cover during use, making it safer in use.

Figure 5:
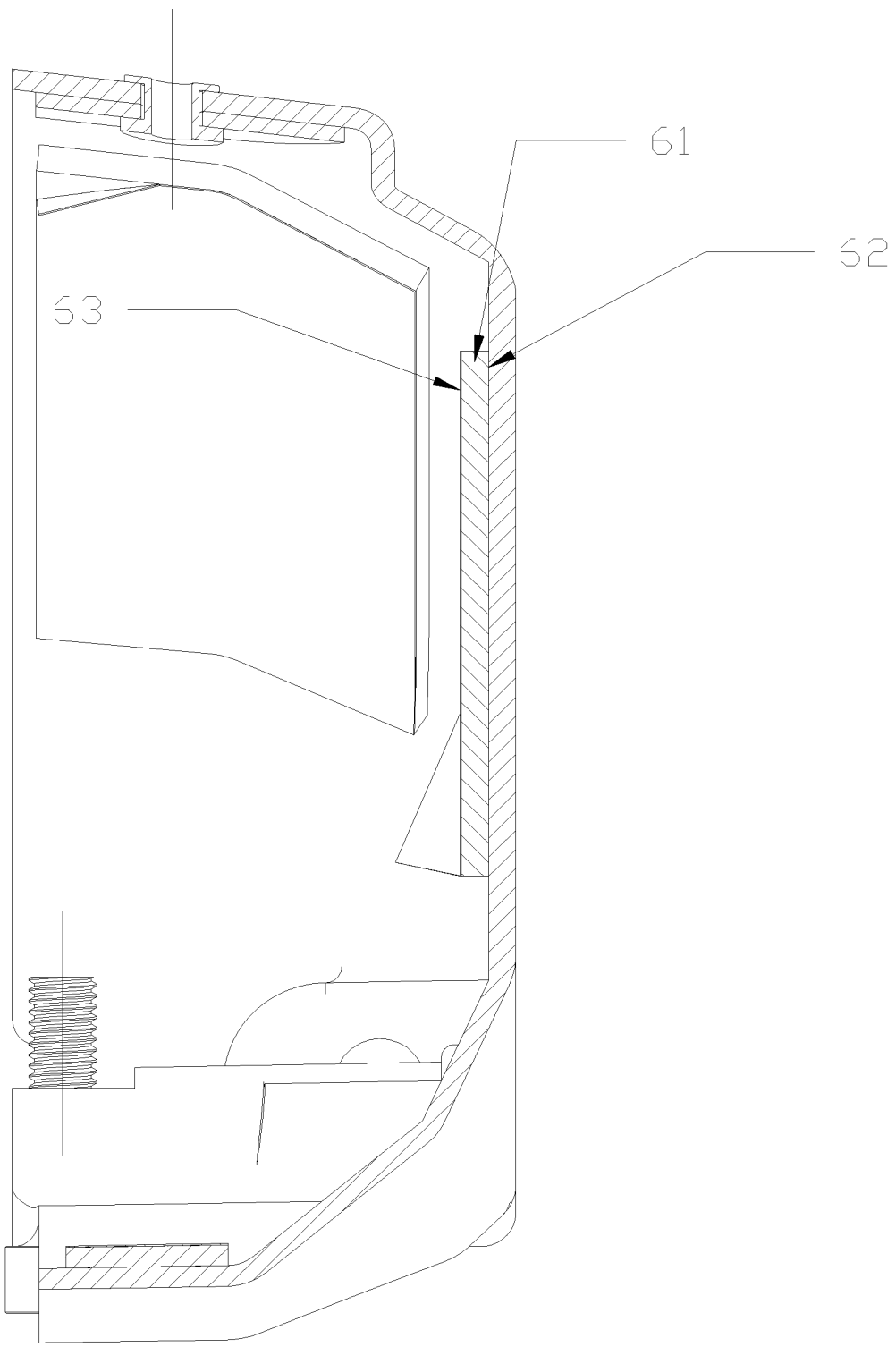
FIG. 5 is a schematic cross-sectional view taken along section line A-A in FIG. 1.

Further, in a preferred embodiment of the present application, as shown in FIGS. 1 and 5, the multi-piston-dedicated heat dissipating caliper cover with easy installation further includes four heat dissipating assemblies 60, which are respectively disposed on sides of the caliper cover body 10, the first arc-shaped side plate 20 and the second arc-shaped side plate 30 that are close to the brake caliper 70. The heat dissipating assemblies 60 are used to transfer the heat of the brake caliper 70 to the caliper cover. The heat dissipating assembly 60 includes a heat dissipating silicone sheet 61, a heat dissipating adhesive layer 62 and a thermally conductive silicone cloth 63. The heat dissipating adhesive layer 62 is disposed on sides of the caliper cover body 10, the first arc-shaped side plate 20 and the second arc-shaped side plate 30 that are close to the brake caliper 70. The heat dissipating adhesive layer 62 is used to fix the heat dissipating silicone sheet 61 to prevent the heat dissipating silicone sheet 61 from falling off during use. The heat dissipating silicone sheet 61 is disposed on a side of the heat dissipating adhesive layer 62 that is close to the brake caliper 70. The heat dissipating silicone sheet 61 has good thermal conductivity and can quickly transfer the heat generated by the brake caliper 70 to the caliper cover. Also, the heat dissipating silicone sheet 61 is soft and can increase the contact area between the caliper cover and the brake caliper 70. The larger the contact area is, the better the heat dissipating effect will be. At the same time, the heat dissipating silicone sheet 61 can make the caliper cover and the brake caliper 70 fit more closely so as to implement shock absorption, thus avoiding the collision of the caliper cover and the brake caliper 70 during the driving process of the vehicle to produce sound and wear. The thermally conductive silicone cloth 63 is disposed on the side of the heat dissipating silicone sheet 61 that is close to the brake caliper 70. The thermally conductive silicone cloth 63 can protect the soft heat dissipating silicone sheet 61, prevent the heat dissipating silicone sheet 61 from being damaged, and prolong the service life of the heat dissipating silicone sheet 61.

While the present application has been described in detail with reference to the general description and specific embodiments above, it is apparent to those skilled in the art that some modifications or improvements may be made on the basis of the present application. Therefore, such modifications or improvements made without departing from the spirit of the present application will all fall within the scope of protection of the present application.

What is claimed is:

1. A multi-piston-dedicated heat dissipating caliper cover, comprising a caliper cover body, wherein one side edge of the caliper cover body extends toward a side to form a first arc-shaped side plate, and the other side edge of the caliper cover body extends toward a side to form a second arc-shaped side plate;

wherein the multi-piston-dedicated heat dissipating caliper cover further comprises a fixing assembly and at least two first fixing bolts, the second arc-shaped side plate is provided with at least two bolt holes, and each of the first fixing bolts passes through the bolt hole in a one-to-one correspondence and then abuts against a groove at a bottom of a brake caliper; the fixing assembly comprises a bolt fixing sheet and a positioning sheet, the first arc-shaped side plate is provided with a notch, and the bolt fixing sheet is located in the notch and connected with the first arc-shaped side plate; and the bolt fixing sheet is provided with a strip-shaped hole, one end of the positioning sheet is connected with the bolt fixing sheet through a second fixing bolt, and the other end of the positioning sheet passes through the strip-shaped hole and then is inserted into a slot at a top of the brake caliper.

2. The multi-piston-dedicated heat dissipating caliper cover according to claim 1, further comprising at least one heat dissipating assembly for transferring heat of the brake caliper to the multi-piston-dedicated heat dissipating caliper cover.

3. The multi-piston-dedicated heat dissipating caliper cover according to claim 2, wherein the heat dissipating assembly comprises a heat dissipating silicone sheet and a heat dissipating adhesive layer, the heat dissipating adhesive layer is disposed on sides of the caliper cover body, the first arc-shaped side plate and/or the second arc-shaped side plate that are close to the brake caliper, and the heat dissipating silicone sheet is disposed on a side of the heat dissipating adhesive layer that is close to the brake caliper.

4. The multi-piston-dedicated heat dissipating caliper cover according to claim 3, wherein the heat dissipating assembly further comprises a thermally conductive silicone cloth, wherein the thermally conductive silicone cloth is disposed on a side of the heat dissipating silicone sheet that is close to the brake caliper.

5. The multi-piston-dedicated heat dissipating caliper cover with easy installation according to claim 1, wherein a material of the caliper cover body is aluminum alloy.

6. The multi-piston-dedicated heat dissipating caliper cover according to claim 5, wherein an arc of the first arc-shaped side plate matches an arc of the top of the brake caliper, and an arc of the second arc-shaped side plate matches an arc of the bottom of the brake caliper.

7. The multi-piston-dedicated heat dissipating caliper cover according to claim 6, wherein the positioning sheet is L-shaped, and one end of the positioning sheet is provided with a through hole.

8. The multi-piston-dedicated heat dissipating caliper cover according to claim 7, wherein the bolt fixing sheet is riveted to the first arc-shaped side plate.

9. The multi-piston-dedicated heat dissipating caliper cover according to claim 2, wherein a material of the caliper cover body is aluminum alloy.

10. The multi-piston-dedicated heat dissipating caliper cover according to claim 3, wherein a material of the caliper cover body is aluminum alloy.

11. The multi-piston-dedicated heat dissipating caliper cover according to claim 4, wherein a material of the caliper cover body is aluminum alloy.

* * * * *